May 21, 1957 R. J. WAGNER ET AL 2,793,005
AUTOMATIC TEMPERATURE AND WATER REGULATION
FOR PHOTOGRAPHIC DEVELOPING
Filed Dec. 4, 1953 8 Sheets-Sheet 1

INVENTORS
ROBERT J. WAGNER
FRANCIS L. MACALUSO
BY
Harry M. Saragovitz
ATTORNEY

INVENTORS
ROBERT J. WAGNER
BY FRANCIS L. MACALUSO

*Harry M. Saragovitz*
ATTORNEY

FIG. 12 FLOW SHEET — Initial Condition Water Available In Quantity. Too Warm (Above 67° F.)

May 21, 1957   R. J. WAGNER ET AL   2,793,005
AUTOMATIC TEMPERATURE AND WATER REGULATION
FOR PHOTOGRAPHIC DEVELOPING
Filed Dec. 4, 1953   8 Sheets-Sheet 8

INVENTORS,
ROBERT J. WAGNER
BY   FRANCIS L. MACULUSO
Harry M. Saragovitz
ATTORNEY ના
United States Patent Office 2,793,005
Patented May 21, 1957

2,793,005

AUTOMATIC TEMPERATURE AND WATER REGULATION FOR PHOTOGRAPHIC DEVELOPING

Robert J. Wagner and Francis L. Macaluso, Baltimore, Md., assignors, by mesne assignments, to the United States of America as represented by the Secretary of the Army Application December 4, 1953, Serial No. 396,360

16 Claims. (Cl. 257—4)

The invention relates to systems in which it is necessary to maintain the temperature of photographic developing, washing and fixing solutions within narrow limits, and in addition adapted to embody a rugged portable system which accommodates itself to varying conditions of temperature, and the supply of water available, as well as meeting other requirements necessary to insure a foolproof system which may be relied on to insure standardized processing procedure without liability of material variation from the required operating conditions; as well as to reduce, if not obviate, liability of mistakes by inexperienced, careless, unobservant, operators or failure due to casualty in military field operation.

While the invention in its instant embodiment is disclosed as applied to the processing of X-ray film or other cut film or plates, it will be recognized that it is applicable to the regulation of temperature in the processing of motion picture film by the proper proportioning and arrangement of the tanks, with the inclusion of necessary reels and train tank feed conforming to practice in machine-operated reel-film developing systems.

It is a paramount object of the invention to entirely eliminate the requirement of forethought, training and experience in photography or apparatus on the part of an operator in filling water tanks, setting in motion refrigeration or heating unit according to whether the weather is warm or cold, and attending the change of water, or rate of change as the machine operates, to conform to limitations of water supply. That is to say, in case an ample water supply is available, the machine will operate to effect filling of the processing tank and supply a constant, or substantially constant, flow of conditioning water through the system; or, if the supply is insufficient to permit a desired maximum rate of change, it will operate in such manner that the drain on the water supply will be reduced, and intermitted with sufficiently long intervals to avoid excessive waste, and yet maintain the prerequisite conditions for efficient processing of photographic film and prints or the like.

It is an especially important purpose of the invention to present a completely automatic system, in which it is only necessary for any one—novice, or expert—to throw a switch, in order that the tanks will be filled with water to the proper level and so maintained, the water refrigerated or warmed, and maintained within a very narrow range of temperature at which development of negatives or prints may be carried out with high effectiveness, so that standard times for development may be adhered to and maximum good gamma quality values assured, even in operations in extreme climatic conditions in portable systems in isolated and primitive situations.

In battle or remote field conditions, it may be appreciated that at times highly trained personnel may not be available for tending the filling of tanks, replenishing of water with consideration for a limited supply, or avoiding too rapid feed of water to the conditioning unit to enable effective refrigeration or heating to the required temperature.

In the last named situation, if an automatic film feeding mechanism with timing incorporated is available, the novice need only throw a switch initiating operation of our system, and to operate the film feeding mechanism, to insure a standard development of the film during a standard time. If the automatic film mechanism is not available, the operative need only set the film holders in the developing tank for the standard developing time, and then shift the holders to the rinsing and fixing sections for the required times which may be all printed on the tanks or on the film holders or case of the machine.

On account of the fact that apparatus of this kind, even though portable, requires use of heavy material in order to be serviceable under severe usage involved in military field service, it is an important aim of the invention to enable the provision of a system of high efficiency, the capacity of which may be extended without requiring the making of objectionably heavy apparatus, and yet will be an integrated system requiring only a single conditioning unit having the necessary heating and cooling elements which will be automatically responsive according to the condition requiring correction, to establish and maintain a proper water level, and bring the water content of the system to the ideal operating temperature. To this end, it is a very important aim of the invention to enable the provision of a plurality of processing tanks, each easily portable, but which may be manually and easily coupled in series with a conditioning unit, so that the latter may supply circulating water throughout the tanks at the proper temperature.

We are aware that numerous systems having somewhat similar aims, and generally aiming at conditioning circulating water in a system of tanks for film processing, and some of these aim at automatic filling of tanks, timing and change of solutions. These have required the use of motor operated cams, and structural embodiments unsuited to field use, and where the apparatus is sufficiently portable for field use, the automatic operation is deficient in many respects. One of the outstanding objections to prior systems, is that they require dependence on an attendant trained in the work, who must note the climatic and/or water temperautre conditions and set particular switches or valves in accordance therewith, and must initially see that a proper water level is established in the system before certain apparatus is set in operation.

It is, therefore, an object of the present invention to organize such a system and to so coordinate its functional elements that the only thing required of an attendant or user, is to throw a single switch to insure the proper filling of tanks, and the starting in proper sequence of the several operating mechanisms, the operation of valves in coordination with tank requirements, cooling, or heating, and variation in the peculiar order of operations to fit the functioning of the system. Also at the same time automatically fit the operation to the possibilities of an ample water supply, or to limit and reorganize the sequence of events to adapt operation to a water supply of limited nature, or in which constant replenishment is not permissible.

Some of the liabilities thus eliminated involve the possibility of destruction of essential elements if not set in operation in proper sequence and coordination with other elements. For instance, it is an aim to obviate the need for the manipulation of valves to admit, and regulate flow of, liquid before closing a heater circuit, as well as to eliminate manual switches to determine the form of circuits related to various elements of the system, and automatically cause the required sequence or phase relation of operating valves and starting heater or cooler operations, and automatically vary such sequence of operations as conditions affecting such requirements change.

An important aim is to present a novel electrical circuit with relays and electric valve system responsive to combined water level and thermostat action to effect the water flow to fill the process tank, and to control the rate and determine the flow paths and condition the liquid.

At the same time, it is sought to present a system embodied in apparatus of a novel kind which will be light in weight, compact and rugged so that it may be readily ported at a site of operation and also transported by truck without requiring hoists and with a minimum liability of damage in the rough handling involved in hasty military field use and rapid setting up in isolated places.

A related aim is to enable the setting up of a system including a tank unit or two tanks and a conditioner each separately portable by untrained personnel, with a minimum of complication in inter-coupling and by the use of simple means adapted to be rapidly connected and uncoupled manually.

A further purpose is to present such construction that there will be a minimum impedance of movement of, and no liability of injury to, personnel by collision with or obstruction by reason of protrusion of parts from the apparatus, especially in the dark room.

It is an object to present a system which will automatically respond to dangerous conditions to make correction and prevent damage to apparatus.

Another object is to present apparatus readily adaptable to irregularity of floor surfaces.

Additional objects, advantages and features of invention reside in the nature and sequence of steps involved in the carrying on of the invention and in the combination, arrangement and specific embodiment of parts and devices provided to carry out the sequence of events designed and required for the utilization of the invention. These objects, advantages and features of invention will be set forth, evident, or inherent in the following description and accompanying drawings of an embodiment and modifications of the invention, or are inherent in the disclosure so made.

Referring more particularly to the drawings, there is illustrated what may be termed a master or main tank 20, in which water conditioned as to temperature is to be circulated, and in which a number of insert tanks 21 may be set, carrying suitable photographic chemical solutions for developing and/or fixing photographic film; or to develop and fix prints.

This tank may be called a work tank, since the work of development, fixing, and washing of films and paper prints is to be carried on therein, as will be more definitely described.

In order to insure the proper quantity and temperature of the water in the tank 20, a conditioner unit 22 (Figs. 2, 7–8, 10) is provided, constructed to receive at 42 water from a source, such as a reservoir tank or a piped pressure water supply system, and to move the water through a circuit within the system by which its temperature is raised or lowered as the climatic condition requires, and at 27 deliver it into the tank 20 and maintain a predetermined water level of the conditioned water in the tank.

This unit 22 and the tank structure are coordinated in a novel way, so that by operation of thermostatic devices and water-level-responsive means, the conditioner unit is caused to operate in such manner that the tank is filled to a predetermined level and the flow of water from the source is controlled so that the quantity moving through the system does not exceed the capacity of a cooling or refrigerating means in the conditioner to lower its water temperature to the ideal one preferred for the developing process and avoid excessive softening of gelatinous emulsions in both development and washing.

Figure 1:
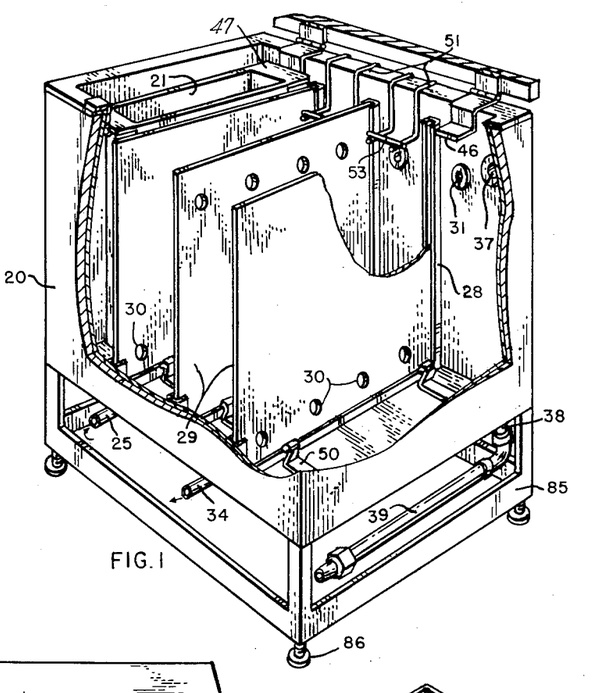
Figure 1 is a perspective view of a portable main tank adapted for use in carrying out photographic processing of films and prints, partly broken away.
Figure 2:
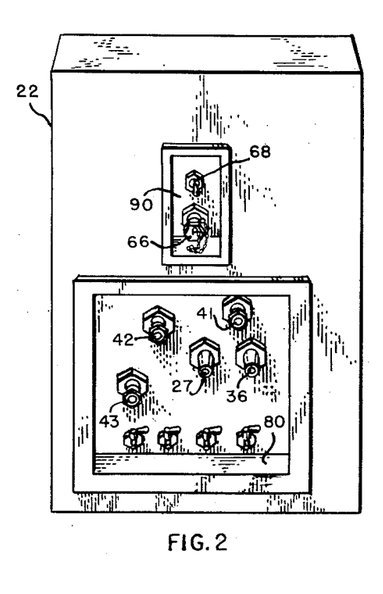
Figure 2 is a formal elevation of a conditioner unit, showing only the water inlets and outlets, cable connection, and master switch location, the details of heater and refrigerating elements being of a conventional nature, and being arranged at discretion in the manner found best suited to utilization of space, accessibility for servicing, and for efficiency in operation.
Figure 3:
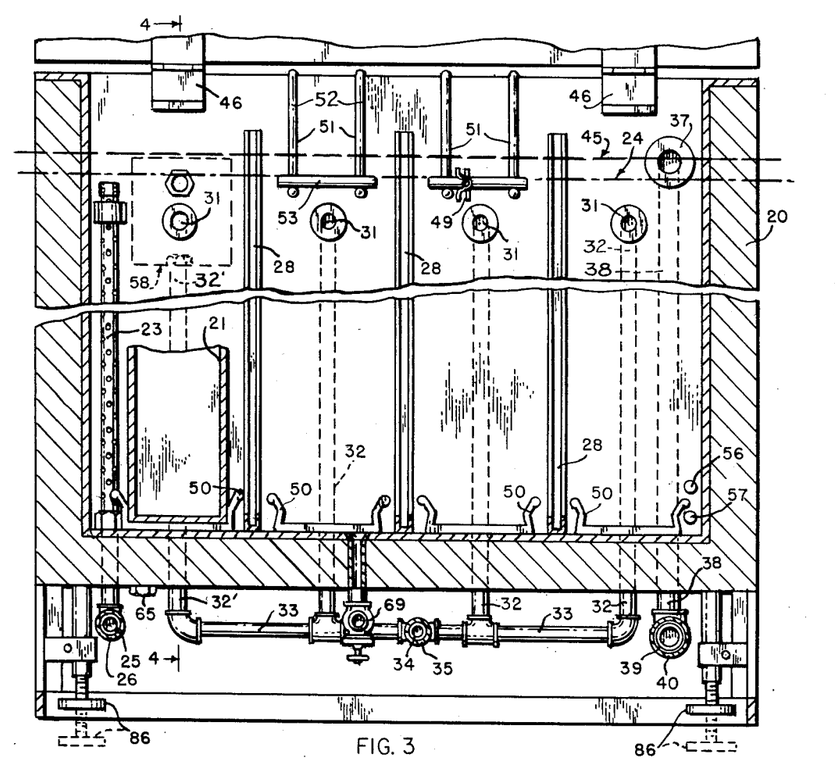
Figure 3 is a transverse sectional view of the tank of Figure 1.
Figure 4:
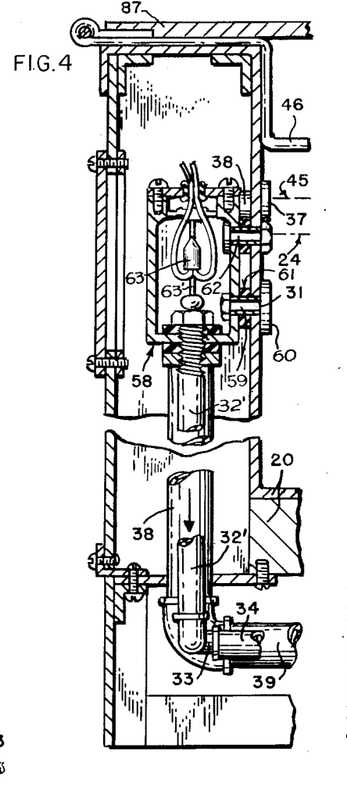
Figure 4 is a vertical cross section of the tank on the line 4—4 of Figure 3.
Figure 5:
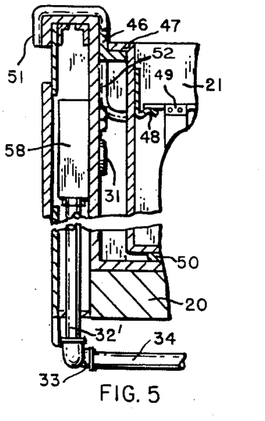
Figure 5 is a fragmentary vertical section on the same line as Figure 4, the details of the float and switch device being omitted, but showing the suspension of an insert tank for photographic developing or fixing solution, brackets for suspending film clips and the like, and form of hangers for suspending clips in washing space in the main tank outside the insert tank.
Figure 6:
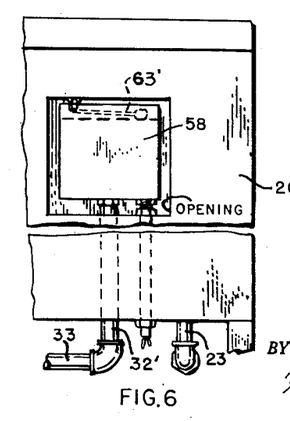
Figure 6 is a fragmentary rear view of the main tank with parts broken away, showing the location of the float switch when mounted on the main tank.
Figure 10:
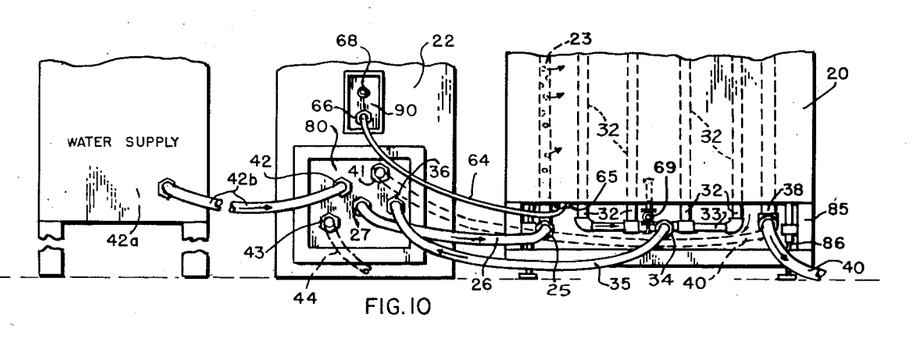
Figure 10 is an elevation of the conditioner and a main tank showing the interconnection of hoses therebetween and the electric cable connection in case the main thermostats and water level switch are located on the tank.
Figure 11:
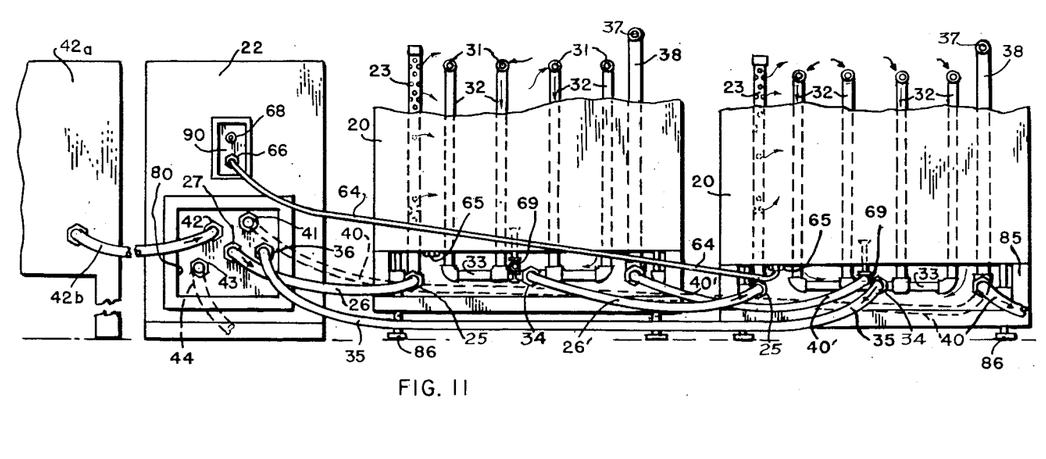
Figure 11 is a similar view showing the conditioner and two tanks and the manner of interconnection by hoses and electric cable to condition water in both tanks by the use of a single conditioner unit.
Figure 12:
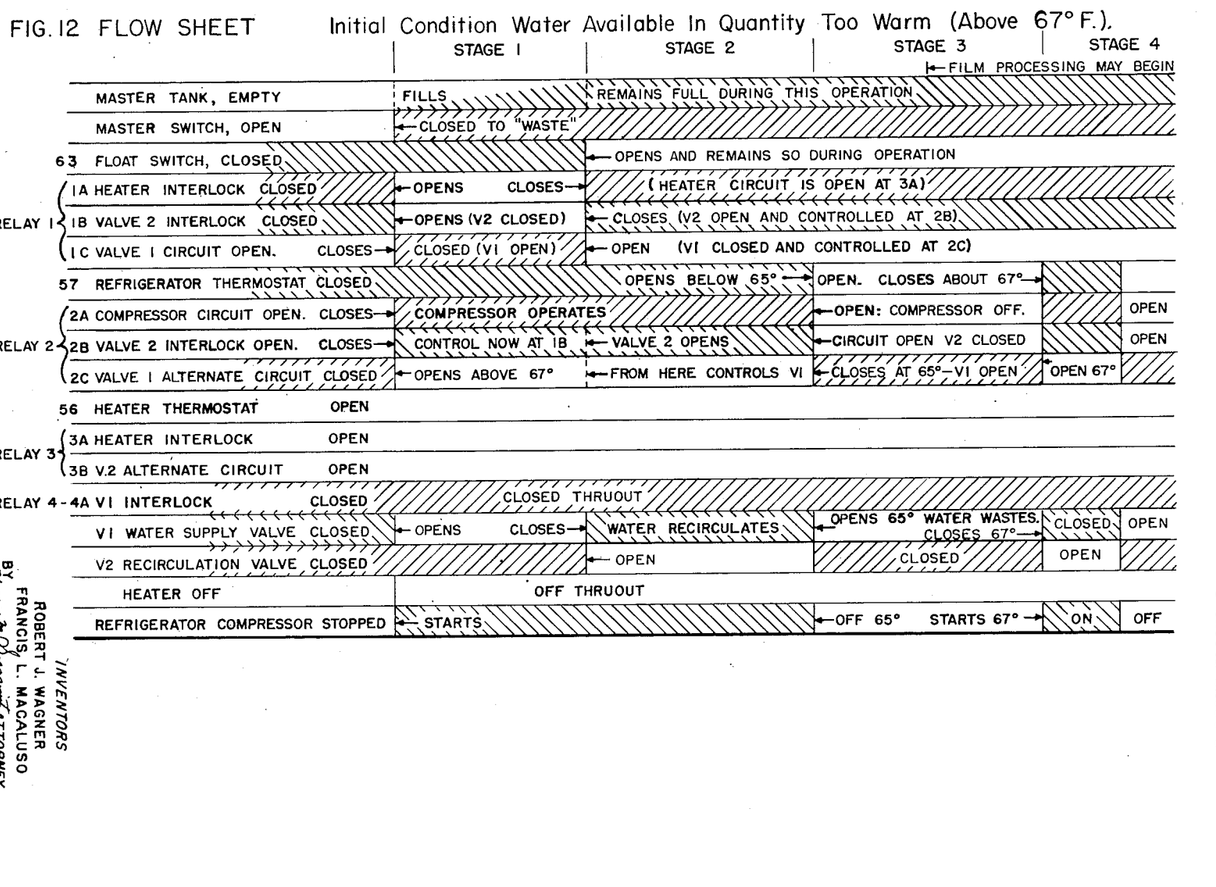
Figure 12 is a flow sheet diagram illustrating the sequence of operations of the elements of the system when in use where water is plentiful, at a temperature warmer than desired in the processing tanks.
Figure 13:
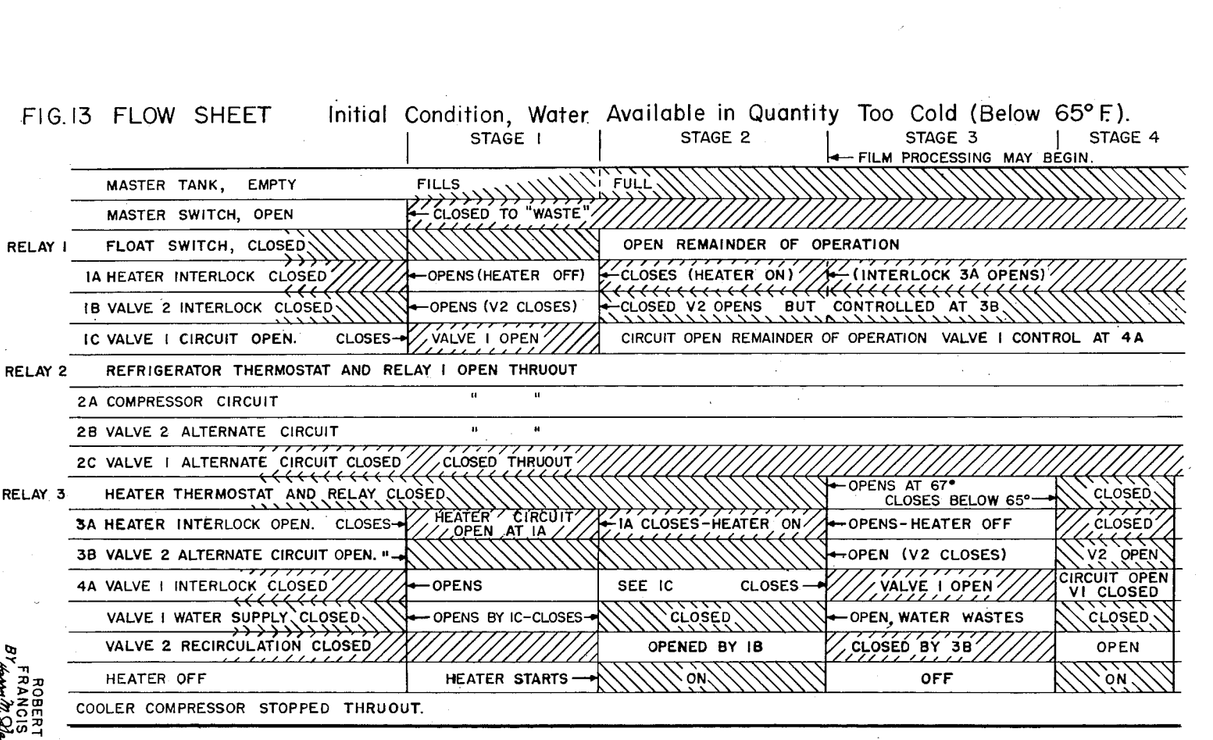
Figure 13 is a similar view showing the sequence of operations where ample water supply is available but too cold for photographic processing requirements.

For the admission of water to the tank 20 a vertical foraminate distributor tube 23 is erected in one corner of the tank, being shown at the rear left hand side in Figures 3, 10 and 11, extending from the bottom of the tank to the intermediate water level 24 indicated in Figure 3. The lower end of this tube has a forward inlet extension 25 (Figs. 1, 3, 7, 8) adapted to separably receive an inlet hose 26 (Fig. 10) extended from the normal delivery point or nozzle 27 of the conditioner 22. The tank 20 is provided with three pairs of opposed vertical guide channels 28 in the front and rear sides of the tank, and in these there are loosely set respective partitions 29 by which the tank is divided into four intercommunicating compartments, the partitions being ported alternately at upper and lower parts as at 30 (Fig. 1). This staggering of the ports 30 prevents stratification of solutions of different chemical concentrations in the contents of the tank. Other conventional means for causing tortuous water circulation may be employed, if desired.

At the back side of the tank four low-level waste ports 31 are formed, from which respective pipes 32 lead downward to a manifold 33 (Fig. 3) below the bottom of the tank, having a single recirculation return or outlet pipe 34 extending therefrom (Figs. 3, 4, 5, 7), to which a recirculation hose 35 (Fig. 10) may be releasably connected, by which water is returned to the recirculation return or inlet port or nozzle 36 on the conditioner unit 22, for recooling or rewarming within the conditioner and re-delivery to the tank from port 27, through hose 26.

In addition to the low level or recirculation outlet ports 31, and at a higher level, a single large high level waste port 37 (Figs. 1, 3, 4) is formed in the rear wall of the tank, from which a waste pipe 38 extends downwardly to a forward extension 39 with which a waste drain hose 40 may be releasably engaged, to extend (as shown in solid lines Fig. 10) to a sewer or other point of discharge of wastes. Alternately in certain forms of operation, especially where the supply water for the system is exceedingly warm, or very cold, this hose 40 may be connected to a waste return nipple 41 at the conditioner, as dotted in Figure 10, by which the cooled or warmed waste water is carried through a heat exchanger 73 (Figs. 7–8) of conventional construction, in the conditioner, to a final waste port and discharge nipple 43 on the conditioner 22. From this a waste hose 44 may be led to the sewer or other waste duct, not shown. Thus, some of the energy expended in conditioning water received at an extreme of temperature may be recovered at the heat exchanger 73 and the newly received supply water pre-conditioned in part at least. Fresh water is admitted to the system from a piped or tank supply 42a through hose 42b to the intake nipple 42 on the conditioner.

The tank 20 is provided with brackets 46 (Figs. 1, 3, 4, 5) at front and rear therewithin, located above the high level 45, and the insert tanks 21 are formed with lips 47 at front and rear to rest on these brackets. Within the insert tanks in turn, there are fixed at front and rear rigid brackets or ledges 48 (Fig. 5) parallel to the front and rear walls of the tank, upon which the extremities of standard film clips 49 (Figs. 3 and 5) may rest, by which films or the like may be suspended in the insert tanks, in a manner well known. The tank 20 is also provided on its bottom with sets of clasps 50 between the guide channels 28 each clasp having upstanding spring arms adapted to yieldingly receive therebetween the bottom of an insert tank 21 suspended from the adjacent pair of brackets 48. In addition removable hangers 51 are provided in the form of heavy wire or bar frames adapted to be hung on the top edges of the walls of the tank at front and rear, each hanger including two pendent parallel arms 52 arranged to rest against the face of the wall of the tank upon which the hanger is suspended, and at their lower ends these arms are formed with integral inward horizontal parallel extensions at the extremities of which horizontal hanger bars 53 are fixed parallel to the adjacent wall of the tank. It may be noted that the bars 53 are at or near the same level as the ledges 48 in the insert tanks, and are similarly spaced from the walls of the tank 20 and with respect to each other in the pair, so that film clips 49 may be rested on the ledges to suspend films or prints in the tank 21, and then on the bars 53 in the tank 20 for washing. While it is not essential that the bars 53 be exactly at the same level as the ledges 48, they should be at least near or below the lower water level 24 before mentioned. It will appear hereinafter that the low level 24 is established by the float switch 63 (to be described), valve V1 and ports 31, while the high level 45 is determined by the level of the large waste port 37.

Figure 7:
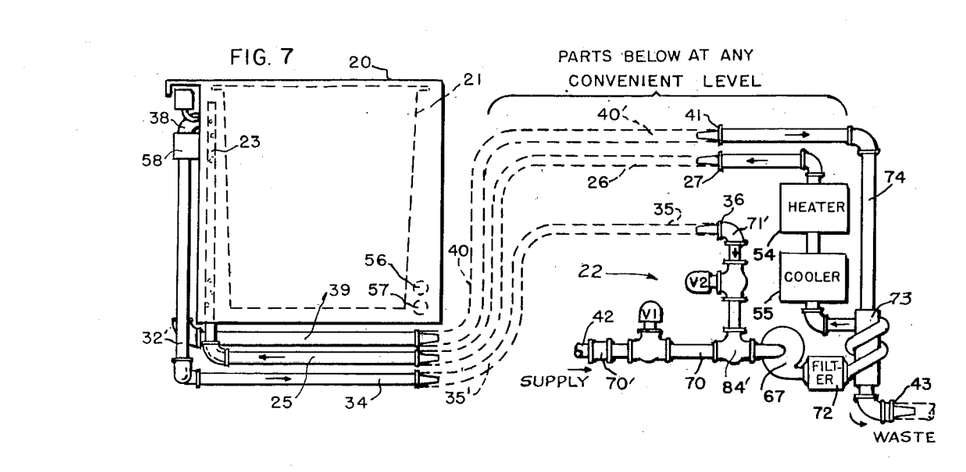
Figure 7 is a diagram of the circulation system and conditioning elements, and controls.
Figure 8:
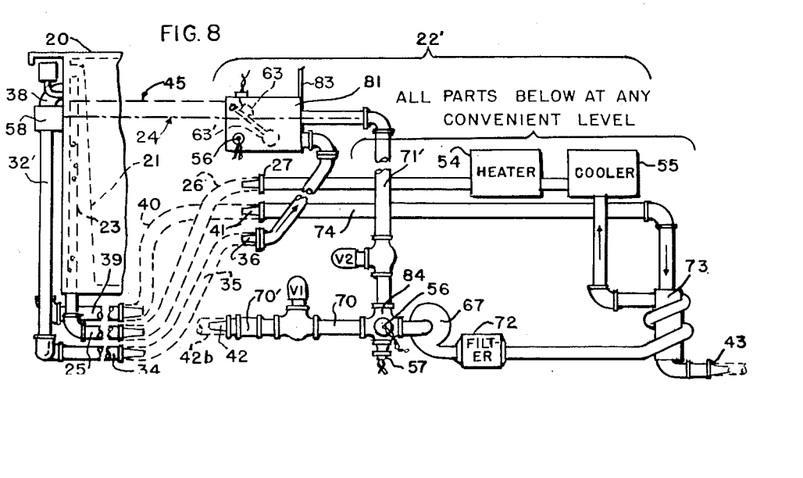
Figure 8 is a similar diagram of a modification of the circulation system and location of thermostat and float switch controls so that the latter may be on the conditioner unit instead of on the main tank.
Figure 9:
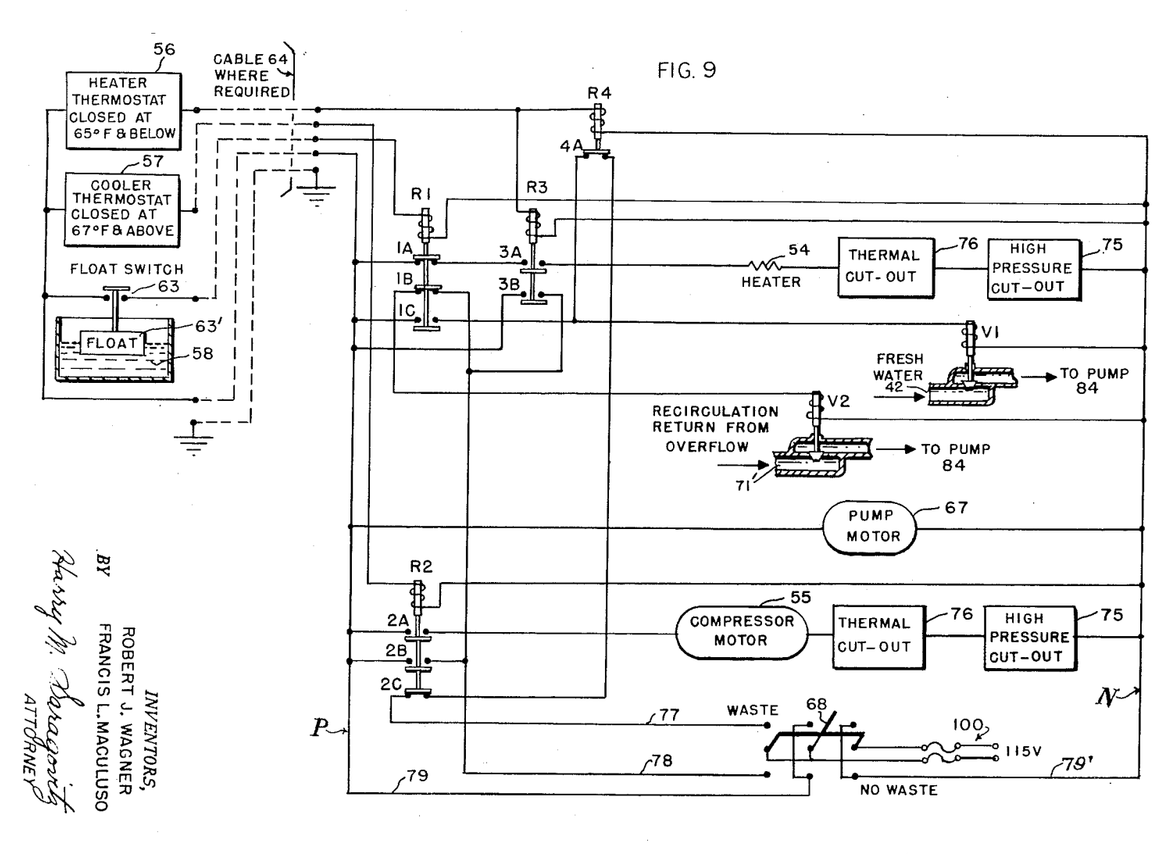
Figure 9 is a diagram of the electrical circuits of the system, operable with either of the systems of Figures 7 and 8.

To control the operation of a heater unit 54 (Figs. 7–8), and a cooling unit 55 in the conditioner 22 respective thermostats 56 and 57 (Fig. 3) are emplaced in the lower part of the tank 20 and conventionally connected in operating circuits with the units in the conditioner or to relays, contacts of which are in the operating circuits of the cooler, valve, etc., as will be subsequently described, and as illustrated in Figures 7, 8, and 9. There is also mounted in the back wall of the tank 20 (see Figure 4) a float switch 63 closed when the tank is empty or water low therein, by which, when the water reaches a desired minimum height, the circuit will be opened, allowing closing of a fresh water inlet valve, and connecting a recirculating valve circuit so that the latter will open. The float switch may be variously embodied and mounted, and also, as hereinafter suggested and illustrated in Figure 8, may be incorporated in a part of the circulating system within the conditioner, along with the thermostats 56 and 57, so that no electrical control devices need be incorporated on the tank, nor cable connections extended from the tank to the conditioner 22.

In the specific form of the tank 22 shown as an example, a float chamber 58 (Figs. 3, 4, 5, 6), constituting a small water reservoir, in the form of a rectangular box-like chamber, forms part of the return path of recirculating water (or, if preferred, merely holding standing water communicated through one port 31), is held to the metal lining on the rear wall of the tank 20 by a nipple 59 (Fig. 4) flanged within the chamber and passing through the wall of the tank where a nut 60 is engaged thereof around. A rubber or like washer 61 around the nipple is also confined between the chamber 50 and the lining of the tank. This nipple 59 forms the recirculating return port 31 at this part of the tank, and a down pipe 32' opens through the bottom of the chamber 58, leading downward to the manifold 33 before mentioned. In addition, an upper, port nipple 62 similar to the one 59 is set through the wall of the tank and chamber 58 and similarly secured to the tank and chamber. The port 62 assures vent of air from the float chamber 58 as the water rises therein and permits the chamber to be otherwise sealed, without preventing the raising of the float.

A float-arm 63' is pivoted on a shaft set across the chamber, and on the arm a mercury switch tube 63 of conventional manufacture is shown arranged to be tilted downward toward contacts at one end of the tube when the float is at its lower position, so that a circuit will be closed, and when water in the chamber has reached the level 24, in the ports 31, the switch 63 will open as schematically indicated in Figure 9. The wire leads from the thermostats 56 and 57, and from the switch 63 may be gathered in a cable 64 which is extended from a suitable quick-detachable coupling fitting 65 at the bottom of the tank 20, to a quick-detachable gang coupler 66 (Fig. 10) on the conditioner 22, from which connections are made to the appropriate relays hereinafter referred to, located in the conditioner. A tank-emptying drain and cock 69 is located at some point in the tank 20.

In the conditioner 22—referring to Figure 7—there are installed a water pump 67 which operates constantly when the apparatus is in use, regardless of varying requirements of conditioning and water supply; the cooler, or refrigerating unit 55, and the heater 54, through both of which in succession water passes from the pump to the tank 20 under all operating conditions and requirements.

A fresh water pipe line 70 leads from the intake nipple 42 (Figs. 2, 7, 8) on the front of the conditioner 22 to the intake side of the pump, and a return pipe 71 from nozzle 36 on the conditioner (supplied from pipe 34 (Fig. 3) and hose 35 (Fig. 10) at the tank 20 from the recirculation ports 31) is connected into the line 70 by a T 84. Solenoid or other electrically operated valves V1 and V2 are incorporated in the line 70 and pipe 71 respectively and are alternately opened automatically (as will be explained) in accordance with special requirements, of climatic conditions and availability of water. In advance of the valve V1 a strainer 70' may be incorporated between the intake nipple 42 and valve V1. For example, in the present instance, the valves mentioned are both conventional solenoid valves which are self-closing by an internal spring (not shown) and open when the solenoid is energized. In the present instance, the electrical source 100 for operating the valves is shown in Figure 9 as a conventional 115-volt service line, either A. C. or D. C. The actual circuit through the valve solenoid is (in one form, illustrated as an example) completed by a relay device in response to some condition in the system, such as water level, or heat in the water at too high a temperature, or at too low a temperature, acting upon respective conventional thermostats. Thus, the closing of a relay or interlocking relays occurs as a result of the closing or opening of initial circuits, and the valves will open when their solenoid circuits are closed, but the closing of the solenoid circuits will not necessarily accompany closing of the controlling circuits to the relays, on account of the fact that certain of the relay contacts operate to closed position when the control circuit is closed, while others pick up to open circuit position when energized. The thermostat 56 for controlling the heater 54 is constructed to close its control circuit at or just below a temperature of 65° F., and to remain open at all higher temperatures; the cooler thermostat 57 for controlling the cooling means or refrigerator unit 55 is constructed to close on rise of temperature to 67° F., or slightly higher, but remain open at all lower temperatures. On this account the two thermostats will never operate to close contrary purpose circuits at the same time.

Also, it will be appreciated that these two thermostats, taken together, constitute means operative to effect a corrective exchange of heat in the unit 22 whenever the water in the system is at an exceptional temperature condition (that is, too warm or too cold), and that upon effecting the necessary exchange to bring the temperature either down to 65 degrees or up to 67 degrees, the respective thermostat will open its contacts to discontinue its operation of the corrective means.

In the water line from the pump a filter 72 is incorporated and a coil in the heat exchange device 73 next receives the water (where heat is transferred from or to waste water from tank 20) and conducts it to the cooler 55, from which the water passes through the heater 54 and by a pipe to the delivery nipple 27 on the conditioner unit. The cooler device has for convenience been assumed to be one including a low boiling point refrigerant which, as a gas, is compressed and circulated through a condensing coil to be liquified, and then expanded in an evaporator coil in contact with the water to be cooled. The details of such refrigeration units are familiar and the cooler 55 may be standard commercial apparatus arranged in compact form within the case of the unit 22, including a motor to operate the compressor and an electric fan (not shown) to circulate air through the condenser coil (not illustrated). The utilization of the refrigerator system may take many forms heretofore practiced, some of which regulate the expansion of refrigerant in accordance with demand manifest through a thermostat in the area or material to be cooled, and this refrigerant may be liquified by other means than a compressor in such case. None of these features of apparatus involve novel features of invention or novel details in the present invention, and so are not illustrated in any form. It has been assumed in the present instance that upon closing of the circuit to the cooler, this will energize the motor of the compressor in the refrigerator device, and initiate condensation and evaporation of a refrigerant. This element is illustrated in block form only.

The same is true of the heater device, which may be any appliance adapted to be electrically or thermostatically controlled in the disclosed mutual coordination with the remainder of the system, and so is shown only in block form.

The thermostat relay devices and solenoid valves likewise may be of various forms commercially available and may be arranged in any convenient places in the conditioner unit conforming to the description and drawing. They require only a formal representation in the diagrams to be understood sufficiently.

At high temperature conditions, the cooler thermostat 57 will always be closed and the compressor will always tend to operate by energizing of relay R2 and pick-up at 2A. In case of failure of the water supply during filling of the tank, when cooled water may not be sufficient to open thermostat 57, excess pressure in the collector of a normal compressor refrigeration system will operate the safety cut-out at 75 to open the circuit and stop the compressor before any injury results. A thermal cut-out guard 76 may also be included in this circuit, if desired, responsive to overload or to excessive heat at the condenser to open the circuit. Similar safety means may be provided for the heater 54, as well as other conventional safety means for the various devices and circuits which do not require illustration.

*Operation*

Referring more particularly to the diagram of circuits in Figure 9, and the mechanical elements shown in the other views, a master switch 68 is shown, which is conveniently located on the front of the conditioner, and for convenience in illustration it is shown as a three-pole double throw switch having two operating positions: viz, one marked "Waste" and the other marked "No Waste," and an intermediate open circuit position. The attendant or user needs only to throw this switch to the "Waste" closed position if water is plentifully available, or to the "No Waste" closed position if water is in short supply, and the apparatus automatically fills the tank and conditions the water to a proper operating temperature, regardless of the initial temperature of the supply.

Thereafter the water is circulated continually through the conditioner and processing tank under "Waste" condition, and also replenished automatically at frequent intervals, length of the intermissions depending upon the cooling capacity of the refrigerating device, or the heating capability of the heater, and the extent of change of temperature of the fresh water admitted necessary to bring it to operating temperature. Under the "No Waste" condition, recirculation is continuous after the tank is filled, subject to infrequent automatic replenishment when casual loss occurs.

The diagram shows two line conductors, P, and N, at the left and right hand sides respectively, and in either position of the switch 68 these are connected by respective blades of the switch through wires 79 and 79' to respective terminals of the service line 100. The third blade of this switch alternatively connects leads 77 and 78 to the same side of the service line as the conductor P. Nearly all of the electrically operated elements of the system are connected between the two lines P and N, directly in the case of the pump motor 67 without intermediate regulatory or circuit make and break means, and in other units, with included circuit-making and breaking means, such as thermostats, float switches and other, as will be more particularly referred to.

With the master switch closed at "Waste" position while tank 20 is empty the float switch 63 operates to close a circuit through the winding of a relay R1, which has three sets of contacts, 1A, 1B, and 1C. The first is normally closed and is shown with the armature dropped to a stationary contact, with that significance, and is in the operating circuit of the heater 54, represented as a resistance coil in Figure 9. The interlock 3A in series with the contacts 1A is operated by relay R3, and is closed by the heater thermostat 56 at low temperatures. Consequently, when the temperature is above 67° contacts 3A in the heater circuit are held open by open control circuit of the heater thermostat 56. At other times, the heater circuit is closed only when the temperature drops to 65 degrees and closes the heater thermostat 56. The second contact, 1B of relay R1 is also normally closed, and is in series with the solenoid of recirculation valve V2 so that when R1 is energized by closing of the float switch 63, during low water or empty tank condition, 1B picks up and opens the operating circuit of the latter valve, which thereby closes, so that no relief of supply water pressure, or direct movement of supply water to the tank 20, can occur at V2 while the tank is being filled through V1; and the water supplied to the tank will be conditioned as it enters, if too warm by reason of opening of valve V1 to the fresh water supply (and feeding of the water through the conditioner 22) which opening occurs by reason of the closing of the control circuit to relay R1 by the float switch, and operation of contact at 1C to closed position to energize the solenoid at V1. (If too cold, the water is heated after filling of the tank, as will appear.)

Relay R1 remains energized and contacts closed at 1C at all times while there is insufficient water in the tank 20 (because the low position of the float 63' will close the switch 63), and the main fresh water supply valve V1 is thereby kept open so that whether the flow be fast or slow from the supply 42a, the apparatus will operate continuously to fill the tank 20 to the recirculation level 24. This would be of value in case the pump motor slows down for any reason, or if the water supply becomes partly choked or otherwise retarded in its flow to the pump 67.

As soon as the tank is filled to the desired level for recirculation, the float switch 63 opens, dropping 1C and permitting the valve V1 to close, while—by the same opening of this switch— the armature 1B is released and falls to closed position completing a circuit to the solenoid of valve V2, through closed contact at armature 2B, picked up by closure of cooler thermostat 57 if the water temperature is high, or, if water temperature is too low the circuit from 1B through V2 solenoid is completed through pickup at 3B by closure of control circuit of thermostat 56 through relay R3. In either of the last named two events, valve V2 is opened because of closure of its operating circuit, and recirculation of water in the system occurs without replenishment for a time. It thus repeatedly passes through the conditioner 22 while heat is extracted or applied in the conditioner.

If the temperature of the water supply is high, this recirculation continues until the water temperature is lowered to 65° F., whereupon cooler thermostat 57 opens, dropping armature at 2B to open position and dropping armature at 2C to closed position. Heater thermostat being open in this condition, relay R4 is open at 4A which drops to closed position. Valve V1 is thereby opened, and fresh water admitted until it warms the content of the system sufficiently to cause a repetition of the cooler thermostat closing and the accompanying cycle. The valves V1 and V2 thus open alternately and the compressor of the cooler operates during the periods when valve V1 is closed and valve V2 open, as well as during the reverse condition of the valves during filling, or low water condition, whenever the water is too warm. However, owing to the fact that in a compressor system condensed liquified refrigerant accumulates sufficiently to maintain further evaporation after stoppage of the compressor, some cooling will continue at full tank during admission of fresh warm water through valve V1, delaying the repetition of the recirculation cycle to some extent, and so reducing the frequency of cycling. At the start of the cooling stage, when water is being recirculated, there is no material rise in temperature of the water content before the expansion of refrigerant becomes effective, because the influx of warm water is stopped instantly and acceleration of refrigeration will more than match accretion of heat to the uniform content of the system before refrigeration becomes of maximum effectiveness.

In the case where water is in short supply at high temperature, the proper operation of the system is effected by the throwing of the master switch 68 to the "No Waste" position, which would be the down position in Figure 9. This breaks the circuit at conductor 77 to the interlock series contacts 2C and 4A, which become inoperative as to valve V1, and the latter then opens only when the water level lowers enough to close float switch 63 and relay contacts at 1C (as by evaporation and removal of water adhering to films and prints washed in the tank, or by being drawn off or removed from time to time for any reason). This position of the switch 68 also connects one of the contacts 1B, 2B and 3B—and consequently the solenoid V2 when switch 63 is open—directly to the power line through conductor 78 (contacts at 2B and 3B being ineffective in this position of switch 68, whether they are open or closed), and leaving control of valve V2 at the normally closed relay contacts 1B, responsive to float switch 63. Under this condition, the valve V2 remains open all the time normally and water is continuously circulated within the system (through ports 31, ducts 32, 34, 35, valve V2, pump 67, cooler, heater, ducts 26 and 25 and distributor pipe 23) as long as the tank is filled. Initially, the water having been cooled as admitted at valve V1, it will be almost immediately ready for beginning of film processing, as soon as the tank is filled.

In the case where water is in plentiful supply, but its temperature is too low (switch 68 being at "Waste" position), it has been thought best for practical use not to have the heater operate while the tank is being filled because the coils might be damaged while empty, or before sufficient water is admitted, or a retardation of water supply for any reason might result in development of steam pressure which would escape above the level of water in a partly filled tank. In consequence, during the filling of the tank, the closed float switch 63 circuit from the line P through relay R1 to line N, holds armature lifted to open position at 1A in the heater operating circuit. (This occurs with high temperature water also, but as the heater thermostat and contacts 3A are then open, is without effect at that time.) As soon as the water raises float 63 sufficiently to open the circuit at switch 63, the armature at 1B drops to closed position in the circuit of recirculation valve V2, and as 3B is now closed by operation of the heater thermostat 56 and relay R3, the circuit through solenoid of valve V2 is completed, opening this valve, which permits recirculation by pump 67 of water returning from ports 31, until the water has been warmed. At the same time the armature at 3A is picked up, closing the circuit to the heater.

As soon as the recirculating water is heated, rising of its temperature opens the heater thermostat, allowing relay 3 to drop open at 3A and also at 3B, opening the heater circuit and the circuit through 1B to valve V2 which is thus permitted to close. In addition, the opening of the heater thermostat opens the circuit to relay R4, which drops the armature at 4A to closed position, causing opening of the valve V1, the relay at 2C being also dropped as long as the water is cool. The pump thereupon receives fresh water from the supply source at its low temperature. This sooner or later lowers the temperature of the content of the system below the proper minimum, and the thermostat 56 again closes, repeating the recirculation and heating cycle. The alternate opening of the valves V1 and V2 with operation of the heater in each recirculation stage continues thereafter throughout operation of the system with water supply at low temperature. Water wastes at 37 whenever the valve V1 is open, so that the water content of the tank is renewed on each cycle.

In the condition where water is in short supply, and the master switch 68 is thrown to "No Waste" position, when the temperature of the water supply is too high, the system operates as follows (as may be understood from the earlier description herein):

Tank 20 fills and water becomes conditioned in exactly the same manner as in the first part of the operation of the system with high temperature supply water previously described. However, due to the shorting circuit at 78, and omission of circuit through lead 77 and the relay contacts at 2C and 4A from the valve V1 control circuit, there will be no operation of the valves V1 and V2 except at 1C or 1B, when the water content is lowered sufficiently to close switch 63, or the water level raised sufficiently to open switch 63. When it is closed, valve V1 is opened at 1C and valve V2 closed by pick up at 1B, while admission of fresh water by valve V1 raises the water level quickly to ports 31 and again opens the float switch, dropping the armature at 1B and restoring the recirculation condition. During recirculation under this temperature condition and position of the switch 68, the only control operations are the closing and opening of the cooler thermostat 57 the cooler compressor 55 operating at each such closing by pick-up at 2A and being cut off at each opening of the thermostat when the water temperature is brought to 65° F. The pump continues to operate throughout the time.

In the condition where water is in short supply and at low temperature, the switch 68 being set at "No Waste," the tank fills by the same sequence of events as described in connection with the operation with switch 68 set at "Waste" position, but, as before mentioned the relay circuits 2B and 3B being ineffective at this position of switch 68 and those at 2C and 4A being inoperative at this position of the master switch, as soon as the tank has been filled to the operating level 24, opening of the switch 63 releases the valve V1 at 1C, and by dropping of the armature at 1B closes the circuit to open the valve V2. This condition remains constant throughout operation of the system at "No Waste" and low temperature, except for the exceptional loss of some water, when closing of the float switch will reverse the relation of the valves and admit fresh water momentarily. The heater is operated at such intervals as required when the temperature of the recirculating water falls to or below 65° F., and is cut off by opening of thermostat 56 after raising the water temperature to 67° F.

The pump 67 continuously operates in this condition also.

*Setting up*

In setting up the apparatus for operation, the tank 20 and conditioner 22 may be placed in the relation indicated in Figures 7 and 10. In practice, it is not necessary for the persons moving the machines into position and connecting them to know details of the mechanisms in the conditioner, nor to be concerned with the making of switch connections or manually operating valves, but only to know whether the water supply is capable of supplying, say thirty gallons of water an hour, or is much deficient in that respect. The pump or water flow therefrom, will be regulated by conventional means in the conditioner unit, to move the desired quantity of water through the system when water in adequate supply is available; but when water is in short supply, not sufficient for continuous waste, it may be automatically recirculated at such rate as determined on by the mere throwing of the switch 68 to "No Waste" position. The filling of the tank, and conditioning of the water and its circulation will then be automatically accomplished by the mechanism.

In arranging the tank and conditioner unit, the water connections are made by means of hoses, as the most convenient means, since no exact spacing and aligning of the units is then required, and simple quick couplings are available at low cost capable of rapid hook-up. The couplings may consist of simple nozzles or pipe ends at the units, onto which the ends of the hoses are pushed frictionally, as shown in Figures 7 and 10.

To simplify the finding of the inlets and outlets to which respective hose ends must be connected, all those on the conditioner unit are brought out to a recess 80 in the front side of the unit, and may be numbered to accord with numbers on the hoses and on the tank inlets and outlets so that a workman can make the proper connections without supervision. The terminations of the conduit pipes at the tank are also located at the front of the tank, and may be numbered to correspond to the hose numbers. For supplying fresh water to the system, a hose 42b may be brought from a simple supply tank 42a to the water supply inlet nozzle 42 on the conditioner. A hose 26 is coupled between delivery nozzle 27 on the conditioner and the pipe 25 supplying the foraminate standpipe 23 on the tank, and the recirculation return hose 35 is connected to the pipe 34 on the tank and recirculation intake nozzle at the conditioner 22. The electrical cable 64 is plugged in at 65 on the tank and at 66 on the conditioner 22. This is all that is required in the hook-up for water in short supply. But in case ample water is available, and the master switch is put in "Waste" position, a hose 40 is slipped on the end of the waste outlet pipe 39 of the tank. This hose may be either led to a waste drain, gutter, or elsewhere, or it may be returned to the conditioner at waste intake nozzle 41, so that waste water will be passed through the heat exchanger 73 by pipe 74 to a final outlet nozzle 43, from which a second or final waste hose 44 may extend to place of final discharge.

It has been before indicated that the conditioner unit may operate to condition water in more than one tank, and in Figure 11 two identical tanks 20 are shown, both connected with one conditioner 22 above described. In this arrangement the fresh water supply is connected the same as where one tank is used, and also the outlet from the conditioner at 27 is similarly connected as before by hose 26 to the inlet pipe 25 of the foraminate stand pipe or distributor pipe 23 of the first tank 20. The return hose 26 from ports 31 and pipe 34 to supply water to the distributor tube 23 there, and a longer return hose 35' is connected from the recirculation return pipe 34 of the second tank to the recirculation intake nozzle 36 on the conditioner. The cable 64 from the second tank is plugged into the conditioner at 66, but no connection between electrical controls of the first tank and conditioner is required.

This last described hook-up is all that is required for operation of the system in case water is in short supply, but if waste is permissible, hoses 40 may be extended from pipes 39 of both tanks to a point of waste disposal, or the hose 40 from either tank may be returned to the conditioner nozzle 41 to pass waste through the heat exchanger and a hose 44 extended from the final outlet 43 of the conditioner to final waste disposal.

In the set-up with two tanks, it is necessary to adjust the level of the second tank slightly lower than the first tank as shown (about 2⅛ inches, in practice) so that water will drain properly by gravity from ports 31 of the first tank into the second tank without waste at waste port 37 in the first tank. It is desirable to have the drain hose 40 provided on the first tank; however, although this will waste little water, if any, especially if the first tank is at a sufficiently higher level than the second tank, insuring most if not all waste from the first tank to pass through its recirculation ports 31. The final waste hose 40 from the first tank may be connected to the tank-emptying drain-fitting 69 of the second tank if desired (as in solid lines in Fig. 11), and in any case the final waste hose 40 from the second tank may be led to the heat exchanger intake fitting 41 on the conditioner 22 as dotted in Figs. 10 and 11, or to a point of final disposal elsewhere, as indicated in solid lines in the two figures named.

In Figure 8 there is shown a modification of the arrangement of the control devices of Figure 7 which were located on the tank 20 in the first described form of the invention, the purpose in this instance being to obviate the need for electrical devices on the tank 20, and requiring no cable connection between the tank and conditioner. This will be of importance in a number of ways, as may be appreciated. This modification calls for no changes in the essentials of circuits or control devices as first described, but only a change in their location, the control responses of the elements and sequence of system functions being identical in all operating conditions as first described.

In the device indicated in Figure 8 all piping and operative water connections may be the same as in the first described form of invention, or as discretion indicates most convenient, except the recirculation return line piping in the conditioner unit which was indicated at 36—71 in Figure 7, by which recirculation return water from ports 31 is brought into the conditioner.

In this instance, the recirculation pipe 71' of Figure 8, corresponding to the one 71 shown in Figure 7, is extended to a high level in the conditioner, such that when the conditioner and the tank are set up, levelled and established at the proper respective levels, the upper part of the pipe 71' will be arranged at or close below the level 24 of the ports 31 in the tank 20. At this part of the pipe, a float chamber or box 81 is incorporated as part of the return conduit, similar to the one 58 but otherwise formed to fit the location and absence of connection to ports 31, but having an inlet at 82 for a return pipe from the recirculation inlet nozzle 36 at the panel 80 on the reconditioner, and for a continuation pipe 74' leading to the heat exchanger 73 as in the case in Figure 7. A small vent pipe 83 may be extended from the upper part of the chamber 81 to prevent the formation of an air trap, and in the chamber a float switch 63' of conventional form may be mounted as before illustrated, or otherwise, and arranged to close a circuit when the water in the system has reached a required level in the chamber 81. A heater thermostat 56' and a cooler thermostat 57' may be mounted in this chamber, or in a fitting 84 forming the junction between the fresh water line 70 and recirculation return 71' as illustrated in Figure 8.

Figure 14:
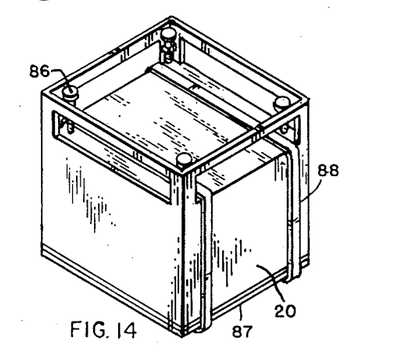
Figure 14 is an isometric perspective of the main tank as arranged for transportation, forming in itself a shipping case.

It may be seen in Figures 1 and 3 that the tank 20 is constructed with a heavy open framing 85 at the bottom of the tank, within which are located the pipe terminals and nozzles or other coupling parts from the ports and stand pipe. The adjustable foot pieces 86 may be screwed up close against the frame 85 so that no projections are left on the unit which could be easily damaged by collison in porting or shipment. When the tank is to be transported, the partitions 29 may be secured against rattling, as well as the insert tanks and hoses, hangers, clips, etc. all retained within the tank 20, with a suitable packing material, and the folding lid 87 of the tank then secured in closed position over the open top of the tank by means of straps 88 as in Figure 14, or other fastening means. The tank may then be handled without special crating as a shipping package.

The nozzles 27, 36, 41, 42, etc., and nipples for draining various parts of the conditioning apparatus within the unit 22, may be terminated within a suitable recess 80 in the front of the unit, and the cable coupling 66 and master switch 68 are shown located within a recess 90 above the one 80 in the front of the unit, so that no projecting parts are exposed on the conditioning unit.

The electrical service line lead from a conventional receptacle (not illustrated) to the power input indicated at 100 in Figure 9 may be located at any convenient point on the unit 22 such receptacles being usually flush or within a recess. The various couplings, both electrical and water conduit forms, may have removable caps to prevent access of fouling detritus when the apparatus is not set up or operation.

Modifications of structure, and arrangement of parts in the system disclosed may be made in many respects, without departing from the spirit of the invention.

In the following claims the tank 20 may be regarded as a part of a duct system through which water is orbitally circulated, or through which the water flows from the source to the point of final discharge from the system.

In certain aspects, the heater 54 and the cooler or refrigeration device 55 may be regarded as heat exchange means within the meaning of such term in the claims when so indicated.

Figure 16:
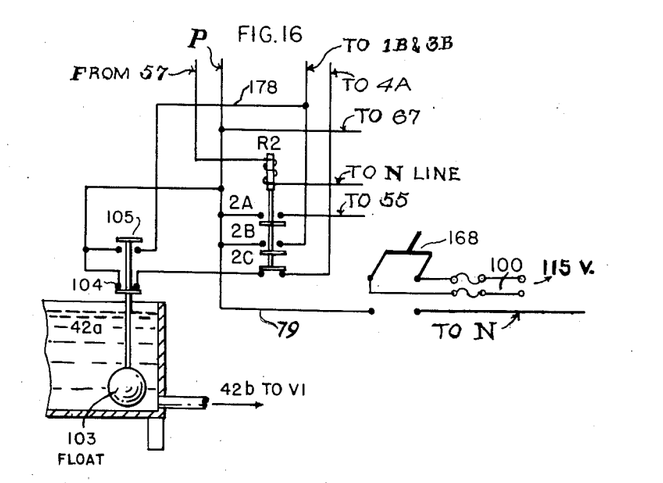
Figure 16 is a partial circuit diagram for the modified system, all parts except those numbered 168, 177, 178, 103, 104, and 105, being the same as in Figure 9 of the complete diagram.
Figure 17:
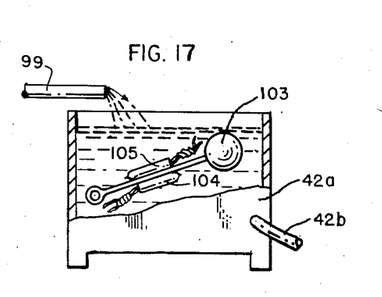
Figure 17 shows an alternative location of the float control device of Figures 15 and 16 for automatic "No Waste" performance when a condition develops requiring such modification of operation in a system normally operating at continual waste of conditioning water.

In Figures 16 and 17 there is shown a modification in which only one position of the master switch is required to set the system in operation for either ample or short water supply, and the system will then automatically accommodate itself to the requirement of either condition, as well as effecting the necessary compensations and operations for lowering or raising supply water temperature and meeting the other conditions and requirements involved as performed by the apparatus before described.

In this instance, the switch 168 corresponding to switch 68, has only an open position and one closed position. In the closed position the essential effective circuits are normally identical with those of the "Waste" position of the switch in Figure 9.

Figure 15:
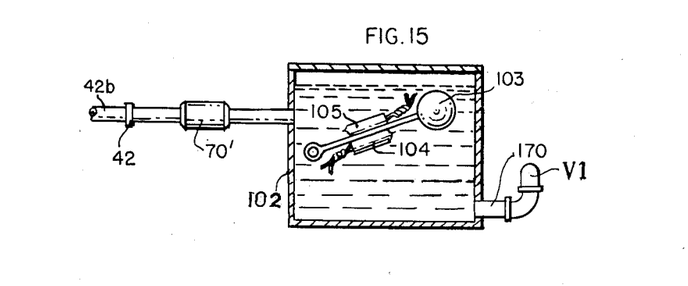
Figure 15 is a detail of an automatic "No Waste" control float device in a modified system automatic in accommodation to ample and short water supply in addition to all other functions of the system, but requiring only closing of a master switch to one position.

For effecting the automatic change of operation from "Waste" to "No Waste" the fresh water supply pipe 170 of Fig. 15, corresponding to the one 70 of Figure 7 has a float chamber 102 incorporated therein having a float 103 which at raised position in the chamber closes a switch 104 maintaining the relay contacts 2C in circuit, and at switch 105 opens the by-pass circuit 178 direct to one end of the winding of solenoid valve V2 (as the lead 78 would at "No Waste" position of switch 68) until the water level falls, when it closes circuit 178 and so by-passes the relay elements 2B and 3B, as in the case of the switch 68 at "No Waste" position. At the same time, low water condition will open the circuit at switch 104 to relay 2C, thus removing that control from the valve V1. The remaining effective circuits are then essentially the same as those presented by switch 68 when at "No Waste" position. This will result in conservation and recirculation of the water stored in the system.

In Fig. 17, these switches may be regarded as tilting mercury tube switches fixed on the pivoted stem of the float parallel thereto, contacts being at the left of tube 104, and at the right hand end of tube switch 105. Thus when the float is at an elevated position the mercury will fall against the contacts in switch 104, and when it falls so as to incline the float stem downwardly, the mercury in tube 105 will fall to the contacts therein.

The reservoir tank 42a may be used to receive the fresh water from a source 99 which may be a pressure supply or other, and the equivalent of the float and switches 104—105 may be provided in the tank 42A at a level where a suitable reserve supply of water below that level may still be standing, so that in case of evaporation, spillage or waste incident to removal of water on prints or films, the occasional operation of the float switch 63 will be able to replenish the supply in the tank 20, as long as water is available in the tank 42a. This system will tend to operate as a waste system whenever the switch 168 is closed. But, whenever exhaustion of the reserve at tank 42a occurs, the system will operate so as to change the manner of operation from "Waste" to "No Waste" before water on hand at the installation has been completely exhausted, and will retain a reserve in the tank 42A available for replenishment of tank 20 by operation of float valve 63' for a considerable period of time. The system of Figures 15–16 will also make the same change in case of depletion or interruption of the water supply, without relation to any reserve available, whereas tank 42A is incorporated, but a pressure supply hook-up employed.

It will be appreciated that a given commercial refrigeration unit will have a capability of water cooling which may be measured in gallons per hour, and there may be a certain minimum circulation required in the system disclosed which must function at extremes of climatic conditions which may reasonably be expected incident to military use throughout the world. It may therefore be necessary to limit flow which tends to develop from a pressure supply system in some cases, so that with the refrigeration capacity of a given unit, a reasonable limited flow or change of water content may be assured while reducing the fresh water temperature from some maximum high temperature, as for instance 95° F., and effect a change of the content of the tank or tanks 20 within some set time. The rate of circulation flow or output by the pump may be determined by the operating motor therefor, and this rate of circulation may be greater than the rate of change of the water content of the system, both at "Waste" and "No Waste" operation, and may be in the neighborhood of 50 gallons per hour or more. The rate of change of content may be regulated by the size of the duct 70 or other means in the fresh water supply line, as discretion dictates. The rate of such change of content may be in the neighborhood of fifteen gallons per hour in "Waste" operation and in such case a plus or minus quantity may be permissible in excess of, or less than the figure named. Other requirements for capacity and rate of water change may be met as conditions dictate. Ordinarily, the rate of operation of the pump will serve as a regulatory means, which will be quite definite if a reciprocating pump is utilized, but the centrifugal type illustrated will be sufficiently effective, and will operate at a volume per hour differing only a little with a pressure supply and a gravity flow supply. Other means for regulating the rate of circulation and the rate of change, may be employed as found expedient.

We claim:

1. Apparatus of the character described comprising a principal tank having a waste outlet at a predetermined high liquid level therein, a water supply and a duct line from the water supply to the tank, a first valve in said line for controlling flow of water from said supply to the tank, means responsive to low water level in said tank to open said valve, a water-conditioning alternatively exothermic and indothermic heat exchanger operatively associated with said duct line, means in said duct line responsive to a predetermined exceptional temperature condition in the water in said duct line in relation to a predetermined mean temperature required and including said heat exchanger to transfer heat correctively to and from water in the duct line according to the variation from said mean, the last named means being responsive to a corrected condition of said water to assume an inoperative condition; a recirculation duct opening from said tank at a predetermined operating water level lower than said waste outlet and communicating with said duct line between said valve and said heat exchanger, a second valve in said recirculation duct, and means responsive to water at and above said operating level and exceptional temperature together to close said first valve and open the second valve and responsive to approximately said mean temperature condition of said water in said duct line to reverse the last named positions of said valves, and means constantly operative to move water in said duct line through said heat exchange unit to said tank and effective to raise the water content of the tank to said high level when said first valve is open.

2. The apparatus of claim 1 in which means is included operative at will to control opening of said first valve responsive to water at and above said operating level in said tank and responsive coincidently to water at said extreme of temperature to close said first valve and open the second one and simultaneously energize said heat exchanger, said means being responsive to water at and below said operating level and to heat in said water when at a predetermined operating temperature to open said first valve and close said second valve.

3. Apparatus of the character described as in claim 2 comprising two electrical circuits one including means as in claim 2, the other including means operative in response to an empty tank condition to open said first valve and close the second valve, and responsive to water at operating level in the tank and extreme of temperature to close the first valve and open the second valve, means responsive to said extreme of temperature to operate said heat exchanger correctively to establish said operating temperature in the water content of the apparatus and responsive to heat of water at operating temperature and said operating level to stop operation of the heat exchanger, and means to circulate said water at operating level orbitally through said tank and heat exchanger device continuously, a power source and a switch connected with said source and movable to an open position and to alternate positions in circuit closing relation to respective said two circuits.

4. The structure of claim 3 including means responsive to water at a level below said operating level to inhibit the heat generating operation of said heat exchanger, and constructed to initiate the heat generating operation of said heat exchanger in response to water at and above said operating level, and at temperature below said operating temperature.

5. A portable system of the character described comprising an independently movable work tank having a water inlet, a low outlet at a minimum operating water level in the tank, and a high outlet at a higher operating water level, a recirculation water conduit from the lower outlet and a waste water conduit from the high outlet; an independently movable water conditioner unit comprising a continuous duct through said unit including a normally inoperative water heating means and a normally inoperative water cooling means and means for independently controlling and activating said heating and cooling means, the heating means including a primary heat generator and the cooling means including a refrigerating means, said unit including an additional heat exchanger for exchanging heat between tank waste water influent to said conditioning unit and water in said continuous duct, said duct having a branched influent part in said unit including a fresh water branch and a recirculation branch, and respective electric valves in said branches each having a normal closed position when de-energized, said unit having a recirculation influent hose separably coupled between the influent end of said recirculation branch and said recirculation water conduit, a fresh water influent hose connected at the influent end of said fresh water branch and constructed for coupling to a fresh water supply, said duct having an effluent end, a hose separably connected thereto and to said inlet of the tank, said conditioning unit having a waste water duct through said additional heat exchanger, a hose separably connected between said waste water conduit at said tank and the influent end of the waste water duct and having a waste hose connected to the effluent end of the waste water duct, means responsive to low water level in the system to close a circuit to said valve in said fresh water branch, and open the circuit to said other valve, means responsive initially to water at normal operating level in the tank to reverse the operative positions of said valves and thermostatic means in the water within the system to control and operate the heater and cooler devices alternatively responsive to respective extremes of temperature of the water, and including means to close the valve in said fresh water branch and open the valve in the recirculation branch during corrective operation of said water cooling means and during operation of said water heating means.

6. The invention of claim 5 including means operative for short water supply and responsive to normal water level in the system to open the circuit to the valve in said fresh water branch continuously, and to simultaneously close the circuit to said other valve continuously.

7. The invention of claim 5 including means responsive to a low level of water in said fresh water branch to open the circuit to said valve in this branch, and close the circuit to the valve in the other said branch.

8. A system of the character described comprising a water conduit system including a work tank in which water at a predetermined operating level and a predetermined range of operating temperature is to be maintained and conditioned, a water conditioner external to said tank in said conduit system arranged and constructed to receive water from a source and to condition and deliver the same to said tank, said conditioner comprising a cooler device in said conduit, a water heater device in said conduit, a fresh water feeder line connected to said conduit, an electrically operated first valve in said feeder line, said conditioner constructed and having a delivery portion arranged to discharge conditioned water to said tank, and having a recirculating return portion from said tank at an intermediate level in the tank, said tank having a waste outlet at a higher level, an electrically operated second valve in said recirculating return portion, a float switch in said conduit and a first valve operating circuit controlled thereby to said first valve, said float switch responsive to low water level in said tank to close said first valve operating circuit to open the first valve, and said float switch having a separate second valve operating circuit to the second valve and being responsive to low water level in said tank to open the second valve operating circuit to close the second valve, a normally open cooler operating circuit to said cooler device, a control means therefor including a first thermostat in said conduit responsive to heat in water in the conduit above a predetermined permissible high operating temperature to close the last named cooler operating circuit, a heater operating circuit for said heater and control means therefor including a second thermostat in said conduit responsive to heat at a lower temperature than a predetermined permissible low operating temperature to close said heater operating circuit, means responsive to low water in the tank to open the heater operating circuit, separate means to operate said first valve including a third valve operating circuit normally closed for operating said first valve and parallel to said first valve operating circuit, and means responsive to closure of either of said thermostats to open said third valve operating circuit to permit said first valve to close, whereby when said float switch is open and the temperature of said water is high or low relative to said predetermined operating temperature said first valve will be permitted to close; means to close the said second valve operating circuit including the first thermostat and a control device, said control device being in series in the second valve-operating circuit to close said second valve operating circuit when the first thermostat is closed and said float switch is open, so as to open the said second valve, and means to close said second valve operating circuit including said second thermostat and a control means, said last named control means parallel to the last named control means in series in the second valve-operating circuit, to close the second valve-operating circuit when the second thermostat is closed and said float switch is open, so as to open the second valve.

9. A tank system of the character described comprising a four-walled receptacle, a water-distributing water inlet device in the tank, said tank having respective spaces therein for certain processing steps, a plurality of outlet ports at a given low operating water-level in the tank and located at respective said spaces, a return duct connected commonly to said ports, a constantly operating water pump having a supply line at its intake, and having its output connected to said inlet device in the tank, means including a duct for pump-circulated water to automatically condition water passing therethrough in a given relation to a predetermined mean temperature, a fresh water supply duct, and means to alternately connect the said supply duct and said return duct to said supply line at intervals proportionate to the capacity of the pump and the measure of heat transfer effective to condition the water content of the system in said relation to said mean temperature, and a waste port in said tank at a higher level than said first named outlet ports, whereby, in intervals when said fresh water supply duct is connected to said supply line, water in the tank in excess of its capacity at the level of the waste port may discharge from said waste port.

10. The structure of claim 9 including partition elements in succession in one direction across the tank defining said spaces, said partitions ported alternately at upper and lower parts to force vertically tortuous circulation of water admitted within the receptacle at an extreme one of said spaces.

11. The structure of claim 9 and a heat exchange device comprising a part of said supply line and a waste line from said waste port.

12. The structure of claim 11 in which first and second identical said tanks are included, the said return duct of the first tank being connected to said water distributing inlet device of the second tank, and said return duct of the second tank connected to said supply line of the pump.

13. The structure of claim 12 in which the waste port of the first tank is connected to discharge to the second tank.

14. The structure of claim 13 in which the waste port of the second tank is connected to said waste line through said heat exchange.

15. The structure of claim 11 in which the waste port of at least one of said tanks is connected to said waste line through said heat exchange.

16. The structure of claim 9 in which a part of the return conduit from at least one of said low operating water level outlet ports includes a float chamber at said level, a float therein and means responsive to movement of said float from a low position below said level to a position substantially at said level to close said connection of the fresh water supply duct to said supply line and connect said return duct only to said supply line, and temperature responsive means responsive to said mean temperature to reverse the relation of the last named said connections of the return duct and said fresh water supply duct.

References Cited in the file of this patent
UNITED STATES PATENTS

| | | |
|---|---|---|
| 1,772,834 | Hopkins | Aug. 12, 1930 |
| 2,365,484 | Moore | Dec. 19, 1944 |
| 2,424,133 | Allcock | July 15, 1947 |
| 2,559,518 | Smith | July 3, 1951 |
| 2,593,038 | Lehane et al. | Apr. 15, 1952 |